(12) United States Patent
Badheka et al.

(10) Patent No.: US 8,521,837 B2
(45) Date of Patent: Aug. 27, 2013

(54) THREE-DIMENSIONAL EARTH-FORMATION VISUALIZATION

(75) Inventors: Mehul N. Badheka, Sugar Land, TX (US); Donald H. Dunbar, Houston, TX (US); Guy Zadikario, Kfar Saba (IL); Yuval Drori, Herzliya (IL); Marc Beuchat, Tel Mond (IL); Peter Ostrin, Raanana (IL); Yaakov Romano, Pardes Hana (IL)

(73) Assignee: Landmark Graphics Corporation, Houston, TX (US)

( * ) Notice: Subject to any disclaimer, the term of this patent is extended or adjusted under 35 U.S.C. 154(b) by 28 days.

(21) Appl. No.: 13/126,082

(22) PCT Filed: Jan. 12, 2011

(86) PCT No.: PCT/US2011/020978
§ 371 (c)(1),
(2), (4) Date: Apr. 26, 2011

(87) PCT Pub. No.: WO2012/096659
PCT Pub. Date: Jul. 19, 2012

(65) Prior Publication Data
US 2012/0179774 A1    Jul. 12, 2012

(51) Int. Cl.
*G06F 15/177*    (2006.01)
(52) U.S. Cl.
USPC ........... 709/217; 709/201; 709/202; 709/203; 709/237

(58) Field of Classification Search
USPC .......................... 709/217, 201, 202, 203, 237
See application file for complete search history.

(56) References Cited

U.S. PATENT DOCUMENTS

| | | | |
|---|---|---|---|
| 2001/0030665 A1 | 10/2001 | Zimmermann | |
| 2006/0061584 A1 | 3/2006 | Kristiansen | |
| 2006/0126844 A1* | 6/2006 | Mauro | 380/261 |
| 2008/0231630 A1 | 9/2008 | Shenkar et al. | |
| 2008/0284796 A1* | 11/2008 | Kagechi et al. | 345/619 |
| 2009/0073191 A1* | 3/2009 | Smith et al. | 345/629 |
| 2009/0325607 A1* | 12/2009 | Conway et al. | 455/456.3 |
| 2011/0304595 A1* | 12/2011 | Holmes | 345/204 |
| 2012/0013705 A1* | 1/2012 | Taylor et al. | 348/14.08 |
| 2012/0019373 A1* | 1/2012 | Kruse et al. | 340/407.2 |

OTHER PUBLICATIONS

International Search Report and Written Opinion issued Sep. 27, 2011 in PCT Application No. PCT/US2011/020978.

* cited by examiner

*Primary Examiner* — Lan-Dai T Truong
(74) *Attorney, Agent, or Firm* — Mark E. Scott; Conley Rose, P.C.

(57) ABSTRACT

Three-dimensional earth-formation visualization. At least some of the illustrative embodiments are a memory device stores a program that, when executed, causes the one or more processors to output from a queue, over a network connection, an encoded video stream of a three-dimensional earth-formation model. The processors are also caused to adjust a size of the queue based on a quality of the network connection.

24 Claims, 5 Drawing Sheets

THREE-DIMENSIONAL EARTH-FORMATION VISUALIZATION

This application claims the benefit of PCT application serial number PCT/US2011/20978, filed Jan. 12, 2011, titled "Three-Dimensional Earth-Formation Visualization", is incorporated by reference as if reproduced in full below.

BACKGROUND

In order to optimize borehole placement and hydrocarbon extraction from an earth formation, a model of the earth formation may be created. Using the model, many simulations can be performed with varying parameters such as injection well placement, extraction well placement, type and volume of secondary recovery fluid extraction, and hydrocarbon production. In many cases, viewing and manipulating the model over a network connection is impossible because of the high processing and networking capabilities required.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Display system" shall mean a single display device, or multiple display devices, coupled in such a way that a processor can directed or indirectly manipulate text and graphics displayed on the single device or multiple devices.

"Display . . . as three-dimensional" shall mean that the underlying object displayed has a three-dimensional character, and the fact that in some cases the object with three-dimensional character is projected onto a two-dimensional surface of a display device shall not obviate status as three-dimensional.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The uses of systems that enable reliable access to applications on remote computers are limited to applications with textual and graphics-poor graphical user interfaces ("GUIs"). Once an application's GUI becomes graphics-rich, e.g., containing three-dimensional visualizations, the image quality of the application and the user-observed latency (the time between a user action and the displayed response to the user action) degrades. In some cases, the applications become unusable.

The various embodiments of the disclosure are directed to outputting, for display, graphics-rich applications over a wired or wireless network connection to remote users on a thin-client platform such as mobile device, laptop, or desktop. Despite the thin-client, the system is designed to make the user experience indistinguishable from the user experience of running the applications locally on a powerful workstation. Additionally, the system is designed for scalability. Multiple servers serve multiple applications to a large number of clients simultaneously in at least one embodiment.

Figure 1:
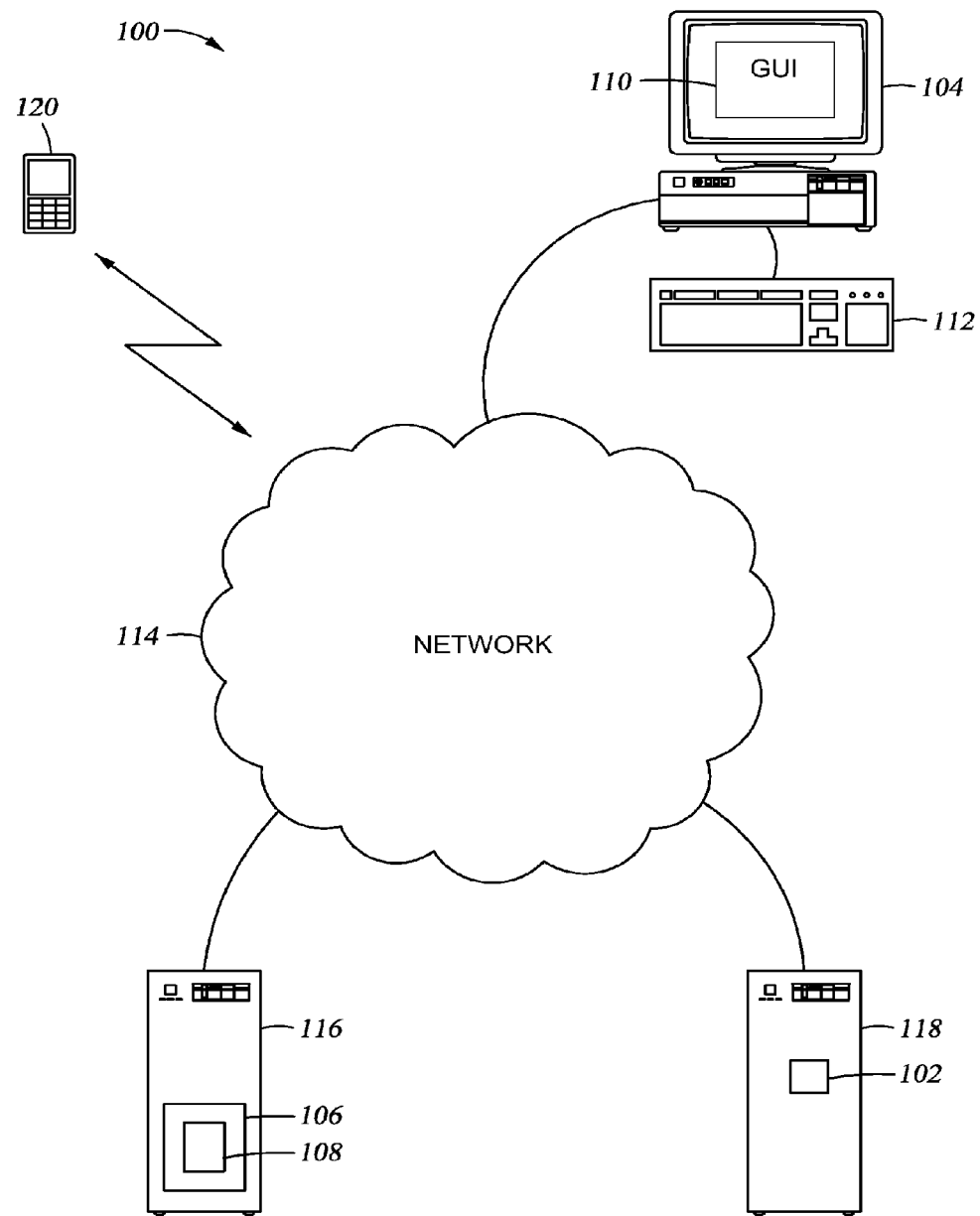
FIG. 1 illustrates a distributed network in accordance with at least some illustrated embodiments.

FIG. 1 illustrates a system 100 with components coupled via network 114 in at least one embodiment. Specifically, the user interacts with the GUI 110 displayed on display 104, and transmits information over the network 114 for processing by servers 116, 118. In at least one embodiment, the display 104 is a computer monitor, and the user can manipulate the GUI via the keyboard 112 and pointing device or computer mouse (not shown). In an alternative embodiment, the user accesses the system 100 via a mobile device 120 having its own GUI and input/output interfaces. In a particular embodiment, the network 114 is the Internet.

Server 118 comprises a processor 102 that executes software 108 located on a machine-readable medium 106 or memory device of server 116. Specifically, a non-transitory machine-readable medium or computer-readable medium 106 stores software 108 that, when executed by one or more processors 102, causes the one or more processors 102 to perform or initiate any of the steps described in this disclosure. Many configurations and combinations of distributed computing are possible.

Figure 2:
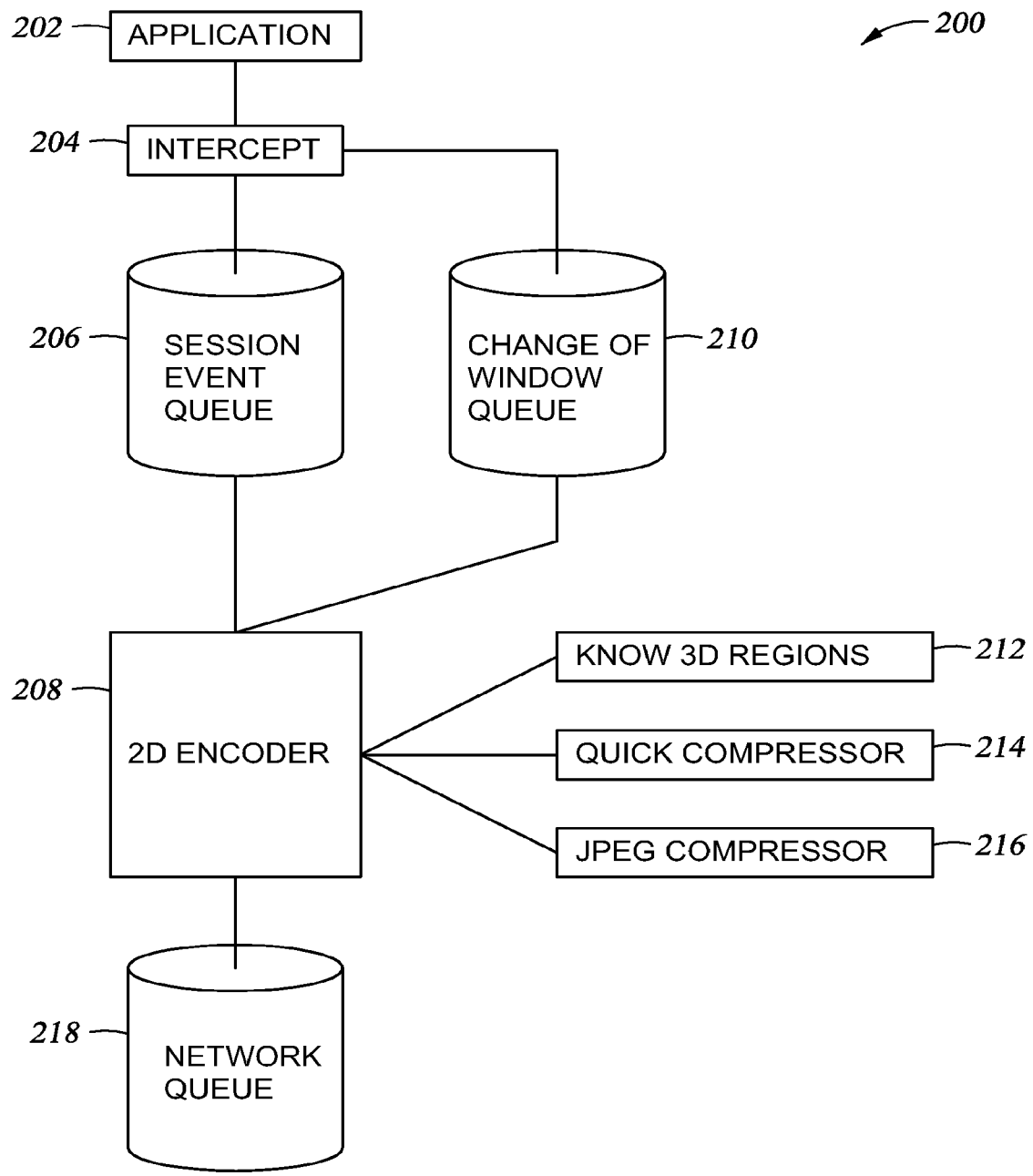
FIG. 2 shows a diagram of a two-dimensional pipeline in accordance with at least some illustrated embodiments.

In at least one embodiment, the system 100 is designed to host applications associated with a model of an earth formation. FIG. 2 illustrates a pipeline 200 in the system 100 from a software perspective. Specifically, a pipeline 200 for two-dimensional data is shown. In at least one embodiment, two-dimensional data comprises textual elements and user interface elements such as menus, buttons, and sliders. The data is generated using two-dimensional rendering application program interfaces ("APIs") such as a Graphics Device Interface ("GDI") for Microsoft Windows or a protocol client library such as Xlib for Unix-like operating systems.

The user, on the client side of the network 114, creates a new session by selecting an application 202 to run on the server side of the network 114 but display on the client side of the network 114. Because most or all of the application 202 processing is performed on the server side, the user can direct activity from a client such as a mobile device 120, which has relatively little processing power and a relatively low-quality connection to the servers 116, 118. In creating a new session, the application 202 calls a windowing system API, e.g., X11 for Unix-like operating systems or Win32 for Microsoft Windows, to create a new top-level window for display to the user. The calls are intercepted by intercept layer 204, which is a dynamic library that connects the application to the session. Accordingly, a new event is generated in the session event queue 206. In at least one embodiment, the session event queue 206 is a ring buffer stored in shared memory, and all processes involved in the session can attach to the shared memory queue and can read/write messages or events from/to the queue. As such, different sessions can communicate with each other using the session event queue 206.

The two-dimensional encoder 208, which runs in each session, compresses two-dimensional portions of the top-level window, and other windows if applicable, into images for the client. In at least one embodiment, the two-dimensional portions comprise textual elements and user interface elements such as menus, buttons, and sliders. A window tracker tracks the geometry and stacking order ("z-order") of the application windows. In order to maintain the user experience that the remote application is running locally, and because local windows may have different z-orders than remote windows, the window tracker integrates remote windows with local windows. As such, the system 100 routes the remote windows' rendering into hidden buffers on the server side to prevent obscuring of an active window due to mismatched z-orders.

Both the two-dimensional encoder 208 and the window tracker receive session events from the session event queue 206 that specify which windows each should compress for display and track, respectively.

When the application 202 requests rendering of a portion of the window using a two-dimensional rendering API call, the intercept layer 204 intercepts the render request and updates another shared memory queue, the change of window queue 210. Specifically, the change of window queue 210 receives information that a particular area within the window has been changed. In various embodiments, the two-dimensional encoder 208 detects which portions of the particular area are two-dimensional regions via various means. First, when new change information is available in the change of window queue 210, the two-dimensional encoder 206 can assume all two-dimensional regions, which includes the particular area, should be updated. Second, in Unix-like operating systems, the two-dimensional encoder 208 can use the XFixes extension events that track changes to X-windows including the particular area. Third, by keeping a backup copy of each window and periodically comparing the current window content against the backup copy, the two-dimensional encoder 208 will recognize the particular area using the comparison. Once the two-dimensional encoder 208 detects the particular area, known three-dimensional regions 212 of the window can be removed from processing. For each area in the two-dimensional update region, the two-dimensional encoder 208 updates the pixel contents for the display device and compresses the contents through a compressor. In at least one embodiment, the compressor can be a quick compressor 214 (providing good compression for text-like display) or a Joint Photographic Experts Group ("JPEG") compressor 216 (providing good compression for image-like display).

The two-dimensional encoder 208 copies the compressed two-dimensional image into the network queue 218. The network queue 218 is a shared memory segment used to buffer and communicate the compressed two-dimensional images between the two-dimensional encoder and the network. In at least one embodiment, the transmission to the remote client is via a Transmission Control Protocol/Internet Protocol ("TCP/IP") communication port.

Figure 3:
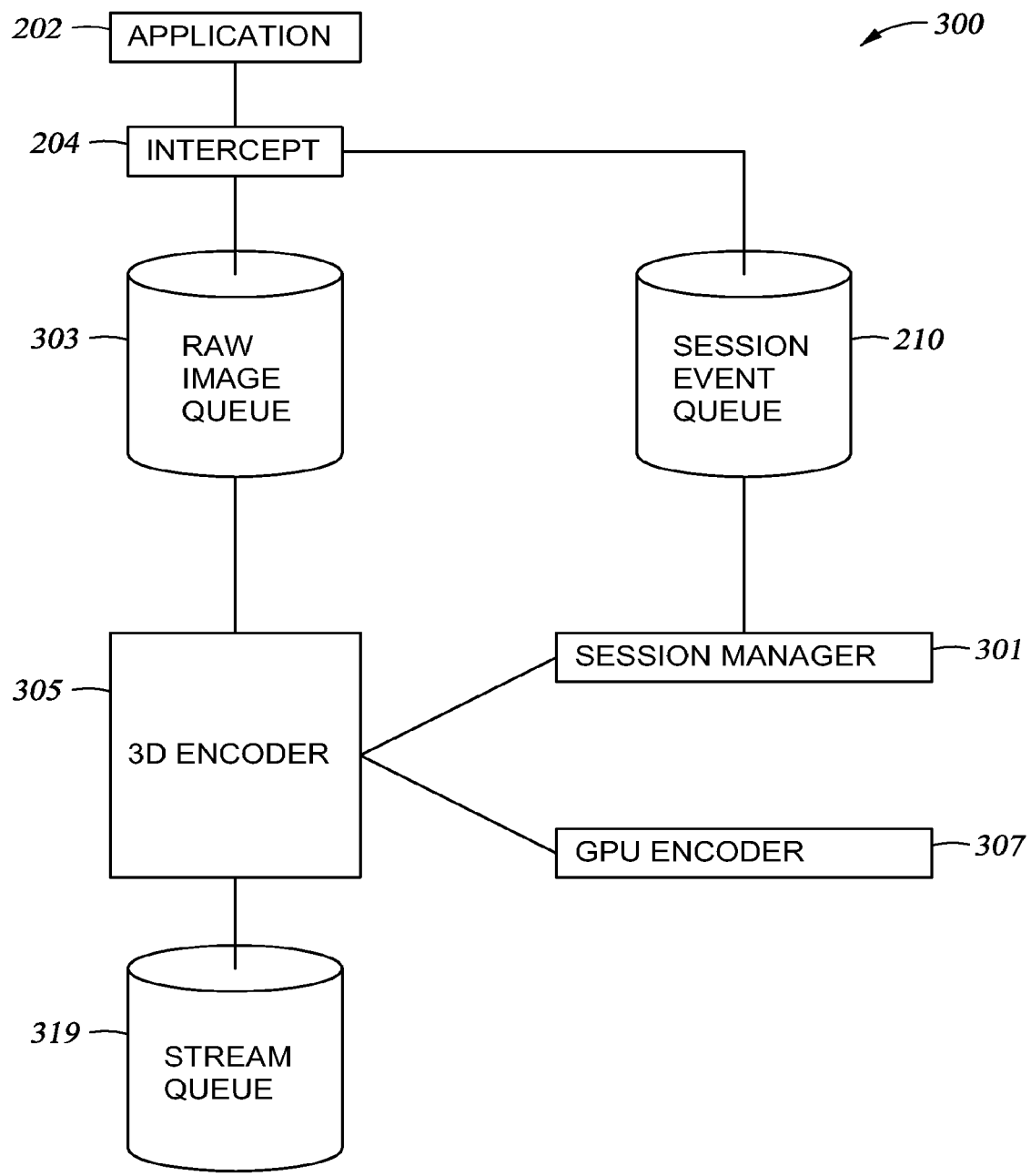
FIG. 3 shows a diagram of a three-dimensional pipeline in accordance with at least some illustrated embodiments.

FIG. 3 illustrates another pipeline 300 in the system 100 from a software perspective. Specifically, a pipeline 300 for three-dimensional data is shown. In at least one embodiment, two-dimensional data is processed via a separate pipeline than three-dimensional data. Three-dimensional data comprises visualization of the model earth-formation "moving" from one point-of-view to another in at least one embodiment. Of course, such movement, while appearing to the user as smooth movement of the model, is actually a series of still images creating an animation via the rate at which the images are displayed. APIs such as Direct3D and OpenGL generate the visualization in at least one embodiment.

The application 202 calls associated with a completed drawing frame in Direct3D and OpenGL are intercepted by intercept layer 204, which is the layer between the application 202 and system APIs. The intercept layer 204 checks to determine to which system window the frame should be rendered. If the completed frame is the first frame rendered to a window, the intercept layer 204 requests the session manager 301 to create a new three-dimensional stream. The session manager 301 is a process that coordinates the various allocated resources and objects in the session. In creating a new stream, the session manager 301 creates a new ring buffer queue, the raw image queue 303, in shared memory used to store raw and uncompressed image data in the YUV format. "Y" represents luminance, while "U" and "V" represent chrominance. In a particular embodiment, the image is converted from the red-green-blue ("RGB") colorspace into the YUV colorspace using 4:2:0 schema by the graphics-processing unit ("GPU") encoder 307. If the raw image queue 303 is full, the session manager 301 can either suspend the application 202, wait until the raw image queue 303 has free space, or drop the image frame in various embodiments. The client can control which action is taken. The session manager 301 also creates a new three-dimensional stream event in the session event queue 210.

The three-dimensional encoder 305 encodes the YUV image data into an encoded video stream of the earth-formation model and places the stream into a queue ring buffer, stream queue 319, for transmission to the client over the network 114. Multiple instances of the three-dimensional encoder 305 may exist in a session. A separate three-dimensional encoder 305 may service each three-dimensional stream using a separate bit-rate even if the content of the visualization of the model is the same for each stream. For clients at the same bit-rate, one three-dimensional encoder 305 may be used. In a particular embodiment, the video stream is encoded in H.264 format. H.264 is a standard of the ITU-T Video Coding Experts Group and the ISO/IEC Moving Picture Experts Group.

The three-dimensional encoder 305 encodes frames, and consequently the video stream, at an adjustable frame-rate as specified by the client. If no new frame is available, the encoder 305 encodes the previously available frame. As such, when the application 202 stops generating new frames, the image quality of the last frame improves until reaching maximum quality.

The system 100 supports clients connected through a low bit-rate connection (e.g., 1 Mb/s or less) while still providing the ability to view and control graphics-rich applications running in high-resolution mode (e.g., 1920 pixels×1200 pixels) and a frame-rate of up to 30 frames-per-second.

The network bandwidth is measured by sending a test packet over the network connection. In at least one embodiment, the size of the test packet is two megabytes. The client receives the packet and replies with a short acknowledgement message. The bandwidth is determined by measuring the time from sending the packet to receiving the acknowledgement message, and this time is referred to as the bandwidth round-trip packet time. The network latency is also measured by sending a test packet over the network connection. In at least one embodiment, the size of the test packet is four bytes. The client receives the packet and replies with a short acknowledge message. The latency time is determined by measuring the time from sending the test packet to receiving the acknowledgment message, and this time is referred to as the latency round-trip packet time. In addition to helping measure the qualities of the network connection, the acknowledgement messages measure and control the number of frames that are allowed to be queued by the operating system network buffers.

In some embodiments, these test packets are sent often because network bandwidth and latency are often changing depending on current network traffic. Thus, any pre-determined or constant values for encoding and transmission may result in sub-optimal performance in some circumstances. Accordingly, the frame rate, the size of the queue, and a bit rate of the output of the queue are adjusted at least once per bandwidth or latency round trip packet time over the network connection. In at least one embodiment, test packets are sent at a predetermined interval. In an alternative embodiment, test packets are sent as soon as the acknowledgement message for the previous test packet is received. In yet another alternative embodiment, test packets are sent regardless of whether the previous acknowledgement message was received. As such, the system 100 may be constantly both sending test packets and receiving acknowledgement messages.

In a particular embodiment, the target bit-rate, frame rate, and latency are adjusted often according to the network conditions as determined based on the test packets. Accordingly, the stream queue 319 outputs the encoded video stream of the three-dimensional earth-formation model, and the size of the stream queue 319 is adjusted based on a quality of the network connection. In at least one embodiment, the size of the stream queue 319 is adjusted to be proportional to a product of the latency of the network connection and the frame rate. Also, the size of the stream queue 319 is adjusted to be two if two is more than a product of a latency of the network connection and the frame rate. For example, latency is in units of seconds, and frame rate is in units of frames-per-second ("FPS"). The product of latency and frame rate results in the number of frames that can be encoded within the latency window. When the latency is, e.g., 100 ms and the frame rate is 30 FPS, the encoder may generate 3 frames during the latency window (0.1*30=3). As such, a queue length of 3 will be an efficient use of resources because the encoder will rarely be idle. Considering another example, if the latency is, e.g., 30 ms and the frame rate is 30 FPS, then the amount of frames inside the latency time is less than one (0.03*30=0.9). In this case, restricting queue size to the floor of 2 encourages better parallelism between the encoder and network layers. In a particular embodiment, the floor is not two, but another value. In another particular embodiment, there is no floor on queue size.

Additionally, the bit-rate of output from the stream queue 319 is adjusted to occupy 90% of a bandwidth of the network connection in at least one embodiment. Many combinations and permutations of the variables may be equivalently used. In a particular embodiment, all clients viewing the same model may display the same number of frames and may experience the same response time. However, a client with a poorer quality connection will display the visualization at a lower image quality than a client with a higher quality connection because of the lower frame rate. In a particular embodiment, different clients may display a different number of frames.

In a particular embodiment, the servers 116, 118 receive keyboard inputs and pointing device inputs from the client over the network connection and emulate the keyboard inputs and the pointing device inputs as a virtual keyboard and a virtual pointing device, respectively. Specifically, input/output ("I/O") events are generated in the session event queue 210 in response to the inputs. As such, the current position of the pointing device, the state of the pointing device buttons, and the keyboard state as well as the current window receiving keyboard input can be mimicked and displayed to the user as part of the video stream. Because the local functions are bypassed in this way, multiple sessions can use the same server desktop area, and the system 100 is scalable.

For the sake of discussion clarity, mostly one client and one session have been used in the examples and discussion above. However, multiple clients may need to view the same earth-formation model using multiple sessions. An oft-recurring scenario involves multiple clients in separate locations wishing to simultaneously view the same model. The system 100 is scalable to accommodate many clients, sessions, and applications running simultaneously. For example, a hosting center is equipped with any number of application servers 116, 118 in at least one embodiment. Each application server 116, 118 is configured to run a list of installed applications chosen by the user, and each server 116, 118 is capable of hosting multiple sessions. In at least one embodiment, no virtual machines are used to host the client sessions, and the server hardware resources are not strictly allocated to any particular session or application. As such, one session can use the full server 116, 118 resources while other sessions are idle. A hosting site manager is a software component running in a hosting center that manages allocation of server resources as requested by clients in at least one embodiment. The site manager is also responsible for client login, user authentication, and licensing control.

A second client over a second connection may use a second stream queue and a second encoded video stream of the three-dimensional earth-formation model. However, the second stream is of the same visualization as the first stream, but optimized for the second network connection. Specifically, the size of the second stream queue is adjusted as the first stream queue, but based on a quality of the second network connection rather than the first. Similarly, the second encoded video stream is encoded at a second frame rate, which is adjustable, and the size of the second queue is adjusted to be proportional to a product of a latency of the second network connection and the second frame rate. The second frame rate may be different from the first frame rate because the quality of the second network connection may be different from the quality of the first network connection. Similarly, the test packets run over the second network connection may lead to different optimizations for the second client. Either client may adjust the model as each may have control of the virtual pointing device and keyboard. Specifically, two sets of input may be received and both may be emulated as a single virtual pointing device and keyboard. Thus, both clients have simultaneous interactive access to the model. Similarly, more than two sets of input may be emulated as a single virtual pointing device and keyboard. In a particular embodiment, one user may have primary control of the session. Should the primary user leave the session or be disconnected, primary control may be automatically or manually passed to another user. As such, the initial primary user need not maintain their session in order for the other users to continue working with the model.

Figure 4:
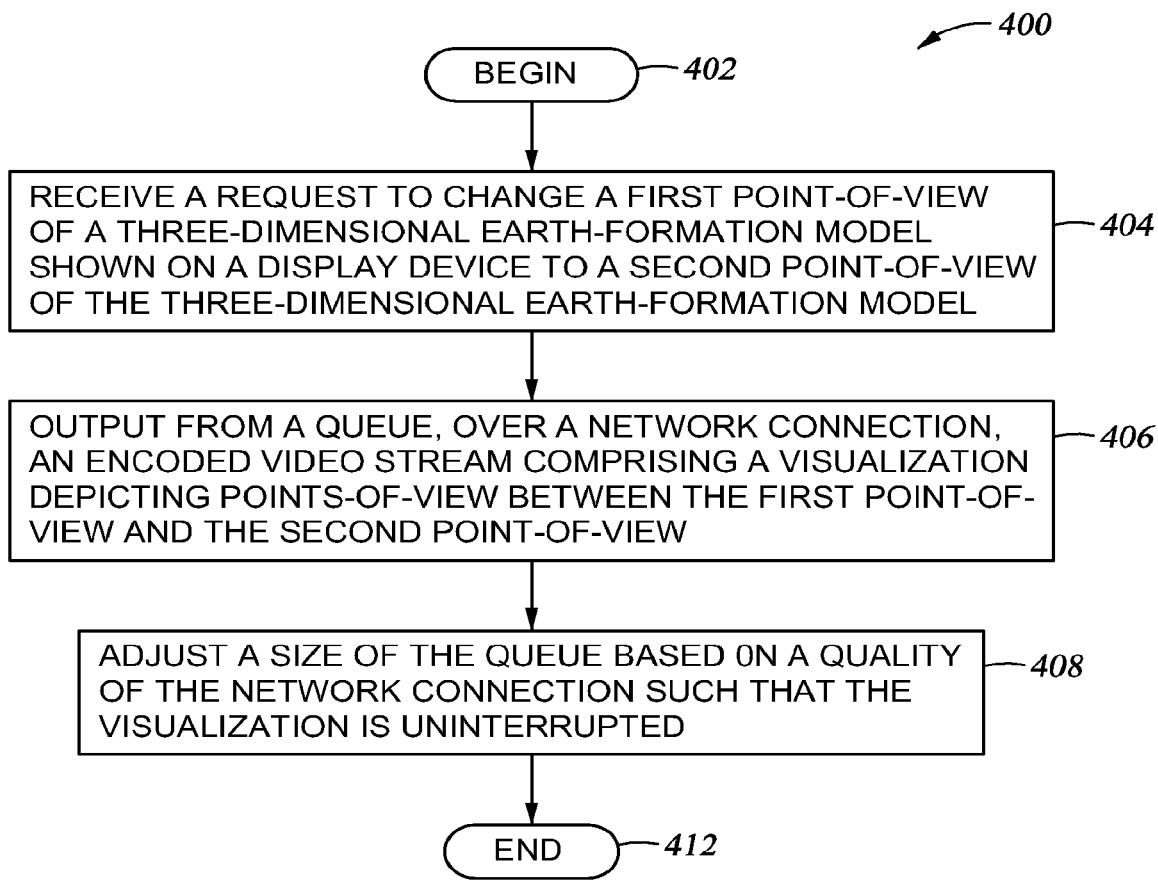
FIG. 4 shows a flowchart of a method in accordance with at least some illustrated embodiments.

FIG. 4 illustrates a method 400 beginning at 402 and ending at 412. At 404, a request to change a first point-of-view of a three-dimensional earth-formation model shown on a display device to a second point-of-view of the three-dimensional earth-formation model is received. At 406, an encoded video stream comprising a visualization depicting points-of-view between the first point-of-view and the second point-of-view is output from a queue, over a network connection. For example, if one user directs the pointing device to turn the model about an axis, the initial position of the model is the first point-of-view, and the final position of the model is the second point-of-view. The visualization is a smooth animation of the turning of the model for each client particular to that client's network connection. As such, points of view leading to the final position from the initial position are encoded as the video stream. In a particular embodiment, the encoded video stream is a H.264 stream.

At 408, a size of the queue is adjusted based on a quality of the network connection such that the visualization is uninterrupted. In a particular embodiment, the size of the queue is adjusted for a client such that an equal amount of time is spent depicting each point-of-view between the first point-of-view and the second point-of-view on that client. As such, the animation will be smooth on the client. The encoding frame rate is adjusted, and the size of the queue is adjusted to be proportional to a product of a latency of the network connection and the frame rate in at least one embodiment. In a particular embodiment, the frame rate, the size of the queue, and a bit rate of the output of the queue are adjusted at least once per bandwidth or latency round trip packet time over the network connection. As such, even a connection of 1 megabit per second or less can be used for a video stream with a resolution of 1920 pixels by 1200 pixels when displayed.

The system 100 allows multiple users to collaborate in the same session and therefore multiple clients can connect to the same session. In a particular embodiment, communication lines between the client and the hosting center use an encrypted protocol for high security. Encryption such as Advanced Encryption Standard ("AES") with key size of 256 is used in at least one embodiment, and the encryption key is replaced periodically.

Figure 5:
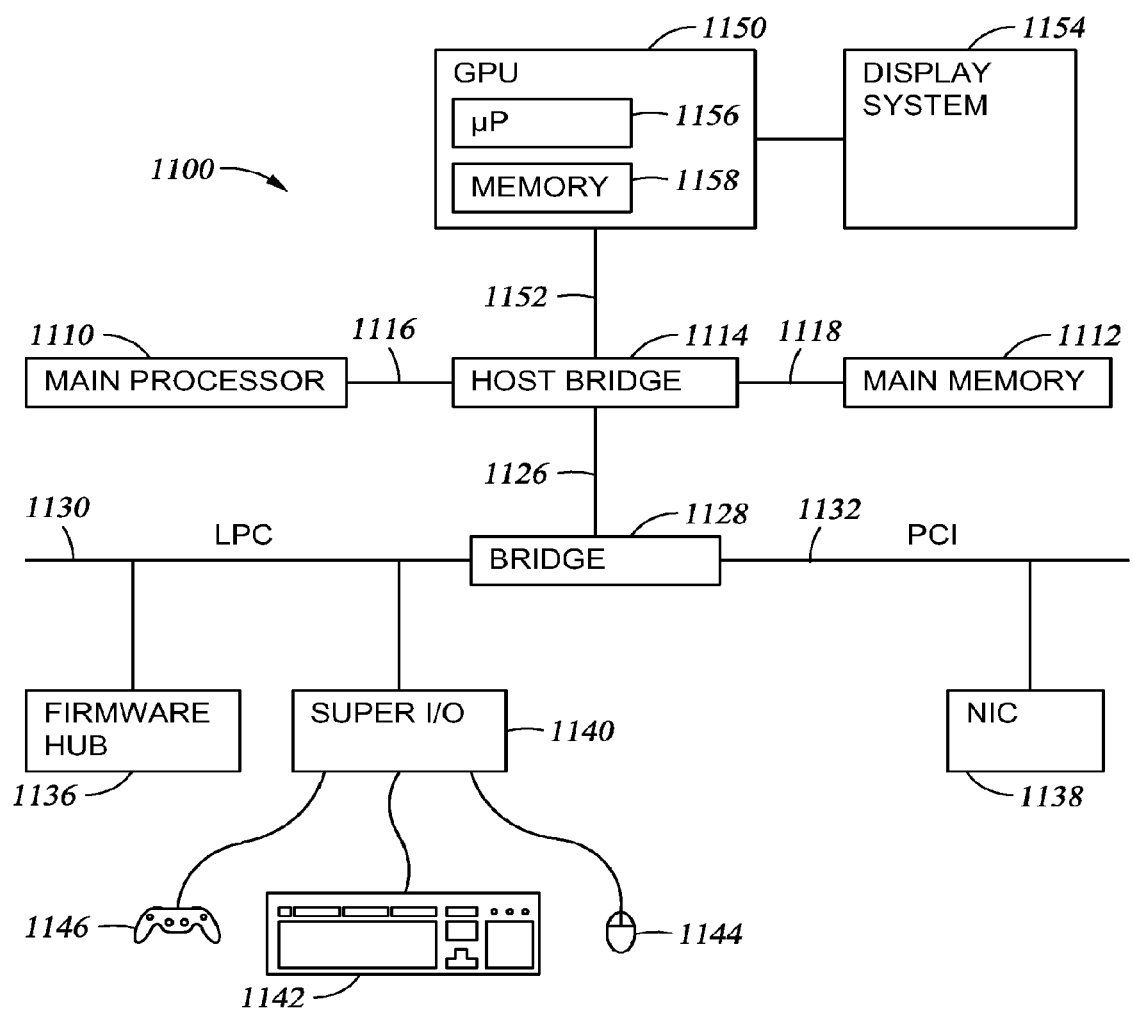
FIG. 5 shows a particular machine suitable for implementing one or more embodiments described herein.

FIG. 5 shows an illustration of a particular machine 1100 capable of implementing the system 100 and the method 400 in accordance with at least some embodiments. In particular, computer system 1100 comprises a main processor 1110 coupled to a main memory array 1112, and various other peripheral computer system components, through integrated host bridge 1114. The main processor 1110 may be a single processor core device, or a processor implementing multiple processor cores. Furthermore, computer system 1100 may implement multiple main processors 1110. The main processor 1110 couples to the host bridge 1114 by way of a host bus 1116 or the host bridge 1114 may be integrated into the main processor 1110. Thus, the computer system 1100 may implement other bus configurations or bus-bridges in addition to, or in place of, those shown in FIG. 5.

The main memory 1112 couples to the host bridge 1114 through a memory bus 1118. Thus, the host bridge 1114 comprises a memory control unit that controls transactions to the main memory 1112 by asserting control signals for memory accesses. In other embodiments, the main processor 1110 directly implements a memory control unit, and the main memory 1112 may couple directly to the main processor 1110. The main memory 1112 functions as the working memory for the main processor 1110 and comprises a memory device or array of memory devices in which programs, instructions, and data are stored. The main memory 1112 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 1112 is an example of a non-transitory computer-readable medium storing programs and instructions, and other examples are disk drives and flash memory devices.

The illustrative computer system 1100 also comprises a second bridge 1128 that bridges the primary expansion bus 1126 to various secondary expansion buses, such as a low pin count (LPC) bus 1130 and peripheral components interconnect (PCI) bus 1132. Various other secondary expansion buses may be supported by the bridge device 1128. In accordance with some embodiments, the bridge device 1128 comprises an Input/Output Controller Hub (ICH) manufactured by Intel Corporation, and thus the primary expansion bus 1126 comprises a Hub-link bus, which is a proprietary bus of the Intel Corporation. However, computer system 1100 is not limited to any particular chip set manufacturer, and thus bridge devices and expansion bus protocols from other manufacturers may be equivalently used.

Firmware hub 1136 couples to the bridge device 1128 by way of the LPC bus 1130. The firmware hub 1136 comprises read-only memory (ROM) which contains software programs executable by the main processor 1110. The software programs comprise programs executed during and just after power on self tests (POST) procedures as well as memory reference code. The POST procedures and memory reference code perform various functions within the computer system before control of the computer system is turned over to the operating system.

The computer system 1100 further comprises a network interface card (NIC) 1138 illustratively coupled to the PCI bus 1132. The NIC 1138 acts as to couple the computer system 1100 to a communication network, such the Internet.

Still referring to FIG. 5, computer system 1100 may further comprise a super input/output (I/O) controller 1140 coupled to the bridge 1128 by way of the LPC bus 1130. The Super I/O controller 1140 controls many computer system functions, for example interfacing with various input and output devices such as a keyboard 1142, a pointing device 1144 (e.g., mouse), game controller 1146, various serial ports, floppy drives and disk drives. The super I/O controller 1140 is often referred to as "super" because of the many I/O functions it performs.

The computer system 1100 further comprises a graphics processing unit (GPU) 1150 coupled to the host bridge 1114 by way of bus 1152, such as a PCI Express (PCI-E) bus or Advanced Graphics Processing (AGP) bus. Other bus systems, including after-developed bus systems, may be equivalently used. Moreover, the graphics-processing unit 1150 may alternatively couple to the primary expansion bus 1126, or one of the secondary expansion buses (e.g., PCI bus 1132). The graphics processing unit 1150 couples to a display system 1154 which may comprise any suitable electronic display device or multiple distinct display devices, upon which any image or text can be displayed. The graphics-processing unit 1150 comprises an onboard processor 1156, as well as onboard memory 1158. The processor 1156 may thus perform graphics processing, as commanded by the main processor 1110. Moreover, the memory 1158 may be significant, on the order of several hundred megabytes or more. Thus, once commanded by the main processor 1110, the graphics-processing unit 1150 may perform significant calculations regarding graphics to be displayed on the display system, and ultimately display such graphics, without further input or assistance of the main processor 1110.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments, and/or to create a non-transitory computer-readable storage medium (i.e., other than an signal traveling along a conductor or carrier wave) for storing a software program to implement the method aspects of the various embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
   one or more processors;
   a memory device coupled to the one or more processors;
   the memory device stores a program that, when executed, causes the one or more processors to:
      receive a request to change a first point-of-view of a three-dimensional earth-formation model shown on a display device to a second point-of-view of the three-dimensional earth-formation model;
      output from a queue, over a network connection, an encoded video stream comprising a visualization depicting points-of-view between the first point-of-view and the second point-of-view;
      adjust a size of the queue based on a quality of the network connection.

2. The computer system of claim 1, wherein the encoded video stream is encoded at a frame rate, which is adjustable, and wherein the one or more processors are caused to adjust the size of the queue to be proportional to a product of a latency of the network connection and the frame rate.

3. The computer system of claim 1, wherein the encoded video stream is encoded at a frame rate, which is adjustable, and wherein the one or more processors are caused to adjust the size of the queue to be two if two is more than a product of a latency of the network connection and the frame rate.

4. The computer system of claim 1, wherein the one or more processors are caused to adjust a bit rate of output from the queue to occupy 90% of a bandwidth of the network connection.

5. The computer system of claim 1, wherein the encoded video stream is encoded at a frame rate, which is adjustable, and wherein the frame rate, the size of the queue, and a bit rate of the output of the queue are adjusted at least once per latency round trip packet time over the network connection.

6. The computer system of claim 1, wherein a bandwidth of the network connection is 1 megabit per second or less and the encoded video stream has a resolution of 1920 pixels by 1200 pixels when displayed.

7. The computer system of claim 1, wherein the one or more processors are caused to process the encoded video stream via a separate pipeline than a pipeline caused to process two dimensional data.

8. The computer system of claim 1, wherein the one or more processors are caused to receive keyboard inputs and pointing device inputs over the network connection and emulate the keyboard inputs and the pointing device inputs as a virtual keyboard and a virtual pointing device, respectively.

9. The computer system of claim 1, wherein the encoded video stream of the three-dimensional earth-formation model is a H.264 stream.

10. The computer system of claim 1, wherein the one or more processors are caused to
   output from a second queue, over a second network connection, a second encoded video stream of the three-dimensional earth-formation model, the second encoded video stream comprising a same visualization as the encoded video stream;
   adjust a size of the second queue based on a quality of the second network connection.

11. The computer system of claim 10, wherein the one or more processors are caused to
   receive keyboard inputs and pointing device inputs over the network connection;
   receive second keyboard inputs and second pointing device inputs over the second network connection;
   emulate both the keyboard inputs and the second keyboard inputs as a single virtual keyboard;
   emulate both the pointing device inputs and the second pointing device inputs as a single virtual pointing device.

12. The computer system of claim 10, wherein the second encoded video stream is encoded at a second frame rate, which is adjustable, and wherein the one or more processors are caused to adjust the size of the second queue to be a product of a latency of the second network connection and the second frame rate, the second frame rate different from the frame rate.

13. The computer system of claim 10, wherein the second encoded video stream is encoded at a second frame rate, which is adjustable, and wherein the second frame rate, the size of the second queue, and a second bit rate of the output of the second queue are adjusted at least once per latency round trip packet time over the second network connection.

14. A non-transitory computer-readable medium storing a program that, when executed, causes one or more processors to:
   receive a request to change a first point-of-view of a three-dimensional earth-formation model shown on a display device to a second point-of-view of the three-dimensional earth-formation model;
   output from a queue, over a network connection, an encoded video stream comprising a visualization depicting points-of-view between the first point-of-view and the second point-of-view;
   adjust a size of the queue based on a quality of the network connection.

15. The non-transitory computer-readable medium of claim 14, wherein the encoded video stream is encoded at a frame rate, which is adjustable, and wherein the one or more processors are caused to adjust the size of the queue to be proportional to a product of a latency of the network connection and the frame rate.

16. The non-transitory computer-readable medium of claim 14, wherein the encoded video stream is encoded at a frame rate, which is adjustable, and wherein the frame rate, the size of the queue, and a bit rate of the output of the queue are adjusted at least once per latency round trip packet time over the network connection.

17. The non-transitory computer-readable medium of claim 14, wherein a bandwidth of the network connection is 1 megabit per second or less and the encoded video stream has a resolution of 1920 pixels by 1200 pixels when displayed.

18. The non-transitory computer-readable medium of claim 14, wherein the encoded video stream of the three-dimensional earth-formation model is a H.264 stream.

19. A method, comprising:
receiving a request to change a first point-of-view of a three-dimensional earth-formation model shown on a display device to a second point-of-view of the three-dimensional earth-formation model;
outputting from a queue, over a network connection, an encoded video stream comprising a visualization depicting points-of-view between the first point-of-view and the second point-of-view;
adjusting a size of the queue based on a quality of the network connection such that the visualization is uninterrupted.

20. The method of claim 19, wherein the size of the queue is adjusted such that an equal amount of time is spent depicting each point-of-view between the first point-of-view and the second point-of-view.

21. The method of claim 19, wherein the encoded video stream is encoded at a frame rate, which is adjustable, and wherein the method further comprises adjusting the size of the queue to be proportional to a product of a latency of the network connection and the frame rate.

22. The method of claim 19, wherein the encoded video stream is encoded at a frame rate, which is adjustable, and wherein the method further comprises adjusting the frame rate, the size of the queue, and a bit rate of the output of the queue at least once per latency round trip packet time over the network connection.

23. The method of claim 19, wherein a bandwidth of the network connection is 1 megabit per second or less and the encoded video stream has a resolution of 1920 pixels by 1200 pixels when displayed.

24. The method of claim 19, wherein the encoded video stream of the three-dimensional earth-formation model is a H.264 stream.

* * * * *